July 30, 1929.  P. A. RITTER  1,722,707
DIESEL ENGINE
Filed March 12, 1927  2 Sheets-Sheet 2

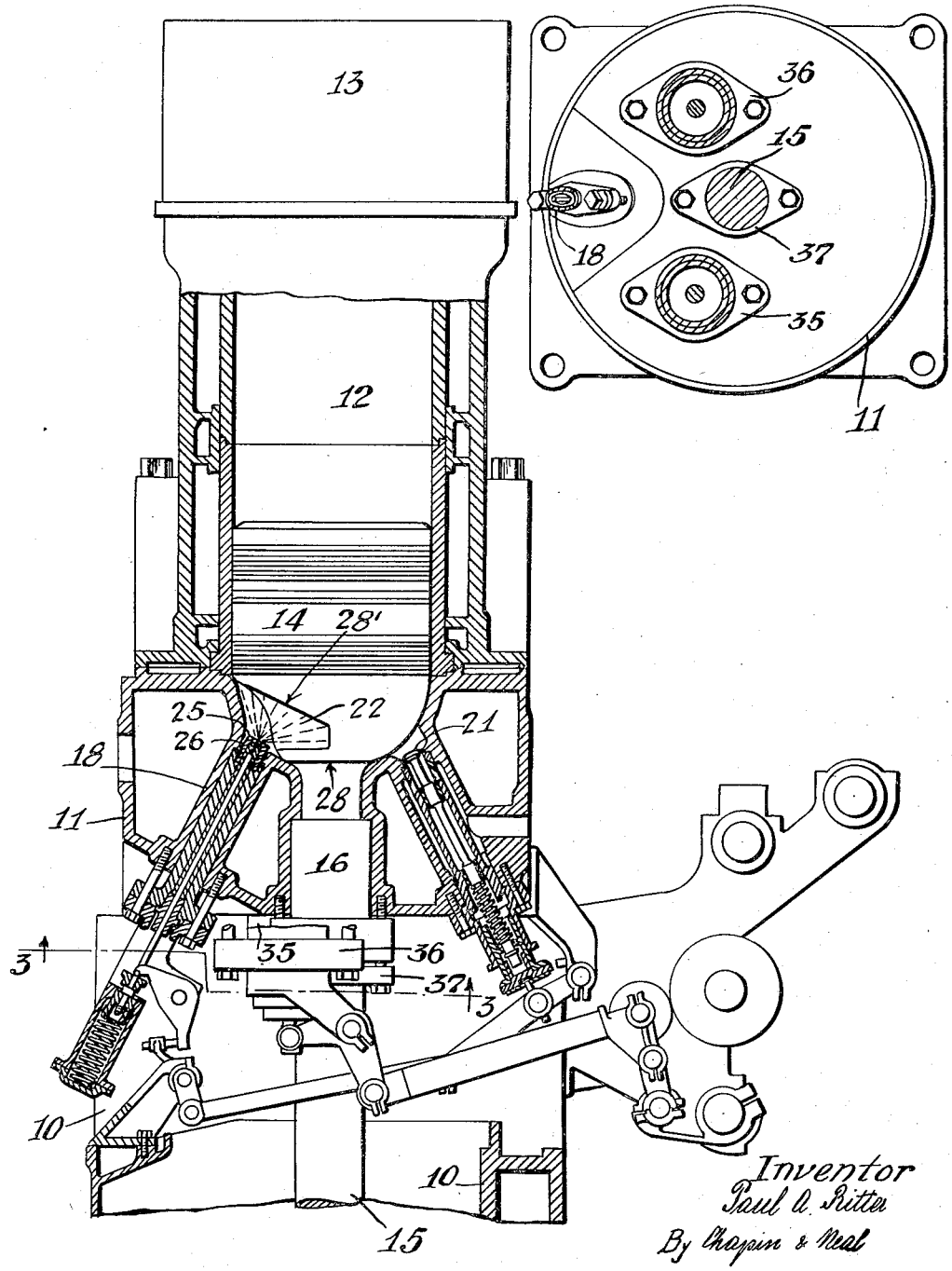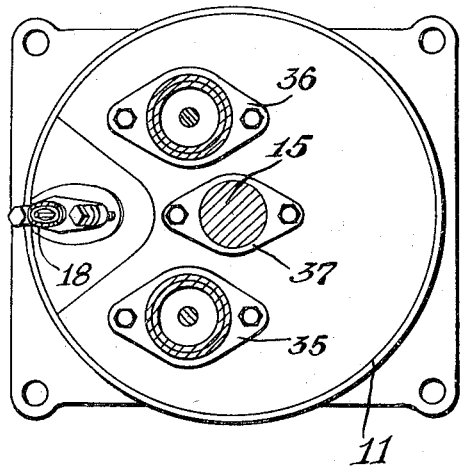

Inventor
Paul A. Ritter
By Chapin & Neal

Patented July 30, 1929.

1,722,707

UNITED STATES PATENT OFFICE.

PAUL A. RITTER, OF AUBURN, NEW YORK, ASSIGNOR TO McINTOSH & SEYMOUR CORPORATION, OF AUBURN, NEW YORK, A CORPORATION OF NEW YORK.

DIESEL ENGINE.

Application filed March 12, 1927. Serial No. 174,939.

This invention relates to improvements in double-acting four-cycle internal combustion engines of the Diesel type.

The problem, with which this invention is directly concerned, is in obtaining a suitable combustion chamber and a suitable disposition of valves, especially the fuel, air-admission, and exhaust valves,—for what is ordinarily termed the lower side of the engine, i. e., that end of the cylinder through which the piston rod passes. Inasmuch as the piston rod passes through the center of the head, the usual arrangement of valves and the usual combustion chamber cannot be used. Particularly, the fuel valve cannot be located at or near the center of the cylinder head as it can be, and usually is, at the other end of the double-acting engine. The difficulties attending the solution of this problem are pretty well understood by those skilled in this art. Occasional attempts have been made to solve this problem heretofore, but the solutions proposed do not satisfy certain conditions which in my judgment should be met.

These conditions, which I desire to meet, are expressed in general objects of my invention, as follows: the provision for the mounting of the air-admission, exhaust and fuel valves in the head; the grouping of these valves closely together and close to the piston rod; the provision of a combustion chamber which is concentrated between the end of the piston and the head; and the avoidance of dead pockets in the combustion chamber.

More particularly, my invention provides for a combustion chamber which is made up in part by recessing the lower end of the piston in a special manner and in part by pockets for the air-admission and exhaust valves. As a matter of necessity, pockets must be provided to secure clearance in operation of these valves. A characteristic of my invention is that these pockets are designed so that they are not simply dead or idle parts of the combustion space, but on the contrary, so that they can be and are effectively utilized. Coupled with the arrangement of the combustion chamber, as described, is an arrangement and disposition of the fuel valve such that the spray of fuel therefrom may thoroughly traverse all parts of the concentrated combustion chamber. The air-admission and exhaust valves are closely grouped and arranged one on each side of the fuel valve and close enough thereto so that the spray from one fuel valve can penetrate into and traverse both the pocket for the exhaust valve and that for the air-admission valve, thus serving to impregnate with fuel all of the air of combustion which is compressed to a high degree between the piston and the cylinder head.

Other features of the invention will appear in the following description and will be pointed out in the appended claims.

The invention will be disclosed with reference to the accompanying drawings, in which:—

Figs. 1 and 2 are fragmentary views in vertical section, taken at right-angles to each other, showing a Diesel engine embodying the invention;

Fig. 3 is a sectional bottom plan view taken on the line 3—3 of Fig. 1;

Figure 2:
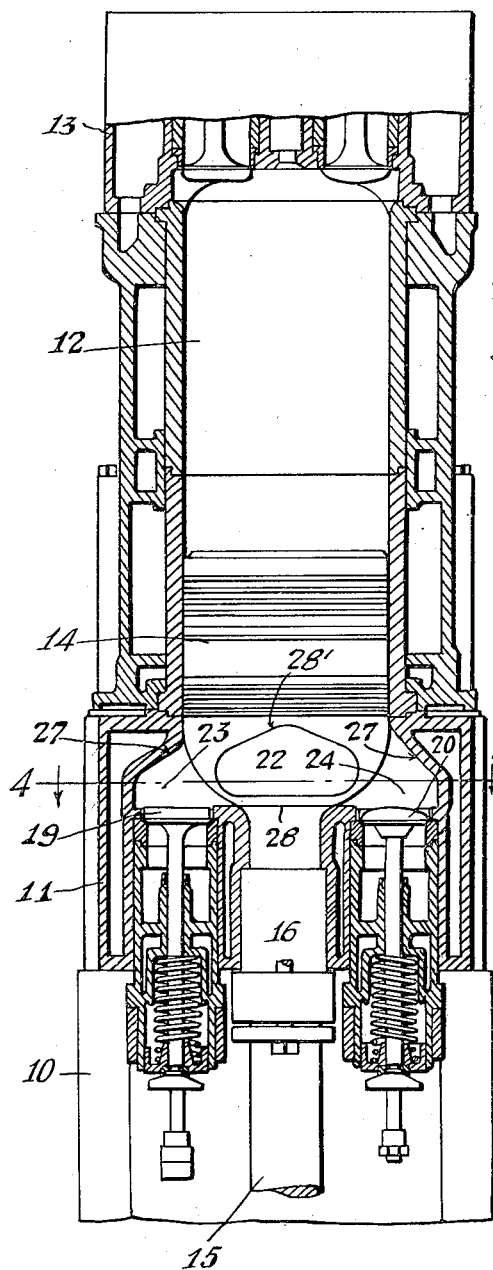

In Figs. 1 and 2 of these drawings, there has been illustrated part of a double-acting, four-cycle Diesel engine. Much of this illustration is in more or less conventional form and many parts, not necessary to an understanding of the present invention, have been omitted to avoid confusion and needless description. Enough has been shown so that those skilled in the art will readily understand how the invention is applied in an engine of the stated type.

The supporting frame is shown in part at 10; the lower head at 11, the cylinder at 12 and the upper head at 13. The piston 14 has connected thereto the piston rod 15 and this passes downwardly through head 11 and a suitable stuffing box, provided therein as indicated conventionally at 16, The connecting rod and crankshaft are not shown as they are or may be of the usual or any other suitable type. The various valves and associated passages together with the valve operating mechanism for the upper end of the engine have not been shown because these also are, or may be, of the usual or any other suitable type. For the lower side of the engine, the various valves are shown as follows: the fuel valve 18, the air-admission valve 19, the exhaust valve 20, and the usual auxiliary air valve 21 used for starting purposes. All these valves are, or may be, of the usual or any suitable type and since, in their construction, they present nothing new, further description of them will be dispensed with. The valve operating mechanism, which has been indicated in part in Fig. 1, is also of the usual type and requires no description herein.

Figure 4:
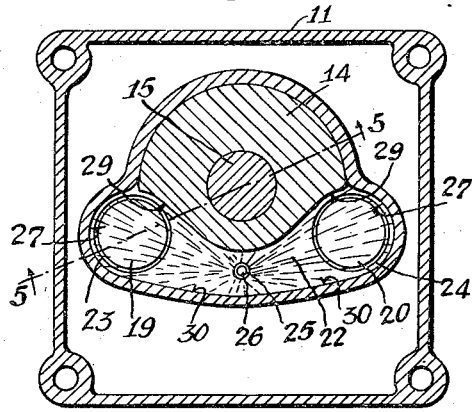
Fig. 4 is a sectional plan view taken on the line 4—4 of Fig. 2.
Figure 5:
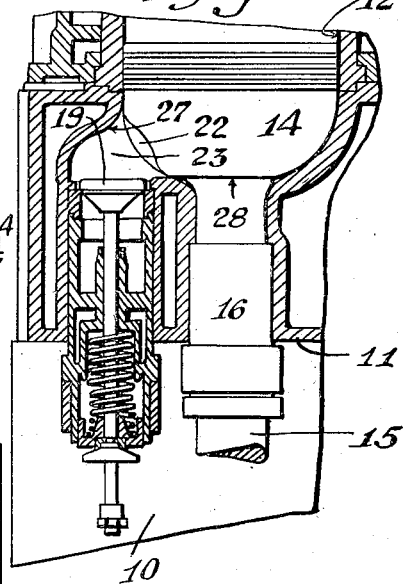
Fig. 5 is a fragmentary sectional elevation taken on the line 5—5 of Fig. 4.

The combustion chamber on the lower side of the engine is, however, of novel form. Such chamber comprises that space left in the cylinder between the lower head 11 and the lower end of the piston 14 when the latter is at the lower end of its stroke and is made up of two principal parts. One of these parts consists of a recess 22 which is formed in the periphery of the piston closely adjacent the lower end thereof. Such recess is arcuate in form and extends part way around the piston, as best shown in Fig. 4. This recess is also radially spaced from the periphery of the piston rod 15 and substantialy concentric therewith. The remainder of the combustion chamber is made up of valve pockets. Thus, the head 11 is recessed to form pockets 23 and 24 to afford clearance for the valves 19 and 20, respectively, and there is a small pocket 25 around the nozzle 26 of the fuel valve 19. Except for these pockets and except for the recess 22, the lower end of piston 14 closely fits the lower end of the cylinder when the piston is at the lower end of its stroke. There will be, of course, clearance between the piston and head but such clearance space is so small as to be for present purposes negligible. Therefore, the combustion space is composed substantially entirely of the sum of the volumes of recess 22 and pockets 23, 24, and 25.

By preference, the lower end of the cylinder, formed by the interior surface of head 11, is approximately hemi-spherical in form and the lower end of the piston, except for recess 22 is correspondingly formed, as shown. In this way, the power impulse, which is initiated from the necessarily axially offset combustion chamber, is directed toward the center of the piston. For similar reasons, the outer walls of the pockets 23 and 24 are given an upward and inward curve or slope, as indicated at 27, so that the power impulses initiated in these pockets are rendered as effective as possible on the piston. The recess 22 is substantially 180 degrees in extent. The cut, by which this recess is formed in the piston (considered in vertical section as in Fig. 1), starts upwardly from the base 28 of piston 14 in a direction about parallel to the axis of the latter and then curves or slopes outwardly as it continues upwardly until it intersects with the outer periphery of the piston. The upper boundary line 28' of recess 22 slopes from a central position of maximum height downwardly on each side toward the base of the piston. The recess 22 thus tapers in height from its center in opposite directions to its extremities and it also tapers in depth at its extremities, as indicated at 29 in Fig. 4. The walls 27 of pockets 23 and 24, which walls are arcs of circles as viewed in plan (see Fig. 4), are connected by walls 30 which are tangential to the walls 27 and to the peripheral wall of the cylinder, thus avoiding any sharp corners in the combustion chamber. The recess 22 and valve pockets 23 and 24 thus gradually merge together to form a combustion chamber which is virtually a unitary affair. The pockets 23 and 24 are not so much pockets in the usual sense as they are carefully laid out parts of the combustion chamber. That is, these pockets are not dead or idle, as is often the case, but rather they are designed to cooperate with and contribute to the usefulness of the combustion chamber. In other words, the pockets, which are a necessity, are utilized and made to serve for something more than their ordinary purpose.

The fuel valve 18 opens into the combustion chamber centrally thereof, its nozzle 26 lying in the pocket 25. The axis of this valve is inclined at an acute angle to that of the piston rod so that the spray therefrom will traverse all parts of recess 22. That is, considering Fig. 1, the spray will pass vertically upward and horizontally inward and in all radial directions between these two extremes, as indicated. Note also, in connection with the combustion chamber when viewed in plan, as in Fig. 4, that there are no obstructions in the path of the fuel spray so that it can reach and penetrate the entire arcuate extent of recess 22 and also penerate into all parts of both of the valve pockets 23 and 24. Thus, all parts of the air, which is compressed in the usual manner to a high degree in the combustion chamber, can be permeated with fuel, rendering all parts of the combustion chamber active and effective.

The air-admission and exhaust valves are located in the head 11 and their axes parallel that of the piston rod. They are not located diametrically opposite as is usual. They are angularly separated by an angle substantially less than 180 degrees and, as shown by an angle of approximately 130 degrees. The effort is to bring these valves as closely together as is feasible and particularly to place them closely enough together so that the spray from the one fuel valve can penetrate into both of their valve pockets. These pockets are thus brought within the range of the fuel spray and while it would be possible to separate them somewhat more than has been shown and still keep them within this range, it would be necessary to increase the volume of the combustion chamber beyond the desired volume. The illustrated arrangement is therefore preferred although it is capable of variation within limits and, therefore, not necessarily essential for all purposes. The effort likewise is to locate the valves in the head (as distinguished from pockets in the cylinder side wall) and to get them as closely as feasible to the piston rod. That the valves have been thus located will be apparent from Fig. 3, wherein the flanged members 35 and 36, by which the cages for the valves 19 and 20, respectively, are held in place, are shown to lie in close proximity to the centrally-located flanged part 37 of the piston rod stuffing box 16.

It will thus be seen that I have provided a solution for the vexing problem of providing a suitable combustion chamber and disposition of valves for the lower side of a double-acting, four-cycle Diesel engine. My solution provides for the location of the air and exhaust valves in the head with their axes paralleling that of the piston rod and arranged as closely as feasible to the piston rod; also, it provides for a concentrated combustion chamber disposed so far as possible between the head and piston and utilizing the valve pockets as useful parts of the combustion chamber. The arrangement also provides for a single fuel valve so disposed that the spray therefrom can reach all parts of the combustion chamber including the valve pockets which are designed to form a useful and effective part thereof.

The invention has been disclosed herein, in an embodiment at present preferred, for illustrative purposes but the scope of the invention is defined by the appended claims rather than by the foregoing description.

What I claim is:

1. In a double-acting four-cycle internal combustion engine, a cylinder, its piston and piston rod, the latter passing through one end wall of the cylinder, said end wall formed to provide a substantially hemi-spherical end for the cylinder, said piston having an end which is substantially hemi-spherical except for a recess formed in and extending part way around its periphery, said end of the piston at one end of its stroke adapted to lie in close proximity to said end of the cylinder leaving an arcuate space formed by the recess in said end of the piston, valve pockets formed in said end wall of the cylinder and opening into said arcuate space one near each extremity thereof and forming with said space the combustion space for the cylinder, admission and exhaust valves located one in each of said pockets, and a fuel valve opening into said space at a point between said first named valves.

2. In a double-acting four-cycle internal combustion engine, a cylinder, its piston and piston rod, the latter passing through one end wall of the cylinder, said end wall formed to provide a substantially hemi-spherical end for the cylinder, said piston having an end which is substantially hemi-spherical except for a recess formed in and extending part way around its periphery, said end of the piston at one end of its stroke adapted to lie in close proximity to said end of the cylinder leaving an arcuate space formed by the recess in said end of the piston, valve pockets formed in said end wall of the cylinder and opening into said arcuate space one near each extremity thereof and forming with said space the combustion space for the cylinder, admission and exhaust valves located one in each of said pockets and having their axes parallel to that of said piston rod, and a fuel valve opening into said space at a point between said valves and having its axis disposed at an acute angle to that of the piston rod so that the spray therefrom is diverted into all parts of said space and into all parts of the valve pockets.

3. In a double-acting four-cycle internal combustion engine, a cylinder, its piston and piston rod, the latter passing through one end wall of the cylinder, said end wall formed to provide a substantially hemi-spherical end for the cylinder, said piston having an end which is substantially hemi-spherical except for a recess formed in and extending no more than half way around its periphery, said end of the piston at one end of its stroke adapted to lie in close proximity to said end of the cylinder leaving an arcuate space formed by the recess in said end of the piston, valve pockets formed in said end wall of the cylinder and opening into said arcuate space one near each extremity thereof and forming with said space the combustion space for the cylinder, admission and exhaust valves located one in each of said pockets and having their axes parallel to that of said piston rod, said valves being angularly spaced with respect to the piston and separated by an angle less than 180 degrees, and a fuel valve opening into said space at a point between said valves and having its axis disposed at an acute angle to that of the piston rod so that the spray therefrom is diverted into all parts of said space and into all parts of the valve pockets.

4. In a double-acting four-cycle internal combustion engine, a cylinder, piston, piston rod and a head through which the piston rod passes, said piston in that end adjacent the head having an arcuate recess and said head being recessed to afford valve pockets communicating with the piston recess, the combustion space being constituted substantially entirely by the combined volumes of the piston recess and the valve pockets, air admission and exhaust valves opening into said pockets and angularly spaced about the axis of the piston rod, and a fuel valve located between the first named valves and adapted to spray fuel into all parts of said piston recess and into all parts of both said valve pockets.

5. In a double-acting four-cycle internal combustion engine, a cylinder, piston, piston rod and a head through which the piston rod passes, said piston in that end adjacent the head having an arcuate recess of substantially 180 degrees angular extent, said head being recessed to form two valve pockets located within the angular range of said arcuate recess and communicating therewith, the combustion space being constituted substantially entirely by the combined volumes of the piston recess and the valve pockets, air admission and exhaust valves opening into said pockets and angularly spaced about the axis of the piston rod, and a fuel valve located between the first named valves and adapted to spray fuel into all parts of said piston recess and into all parts of both said valve pockets.

6. In a double-acting four-cycle internal combustion engine and in combination with the piston, piston rod and the head through which said piston rod passes; air admission and exhaust valves mounted in said head with their axes substantially parallel with that of the piston rod and angularly spaced about the rod by an angle less than 180 degrees, and a fuel valve also mounted in said head and disposed between the first named valves.

7. In a double-acting four-cycle internal combustion engine and in combination with the piston, piston rod and the head through which said piston rod passes; air admission and exhaust valves mounted in said head with their axes substantially parallel with that of the piston rod and angularly spaced about the rod by an angle less than 180 degrees, and a fuel valve also mounted in said head and disposed between the first named valves with its axis disposed at an acute angle to that of said piston rod.

8. In a double-acting four-cycle internal combustion engine, a cylinder, piston, piston rod and a head through which the piston rod passes, said piston in that end adjacent the head having an arcuate recess of substantially 180 degrees angular extent, said head being recessed to form two valve pockets located within the angular range of said arcuate recess and communicating therewith, the combustion space being constituted substantially entirely by the combined volumes of the piston recess and the valve pockets, air admission and exhaust valves opening into said pockets and angularly spaced about the axis of the piston rod, and a fuel valve located between the first named valves and adapted to spray fuel into all parts of said piston recess and into all parts of both said valve pockets, the axes of said air admission and exhaust valves being disposed parallel with that of the piston rod.

9. In a double-acting four-cycle internal combustion engine, a cylinder, piston, piston rod and a head through which the piston rod passes, said piston in that end adjacent the head having an arcuate recess of substantially 180 degrees angular extent, said head being recessed to form two valve pockets located within the angular range of said arcuate recess and communicating therewith, the combustion space being constituted substantially entirely by the combined volumes of the piston recess and the valve pockets, air admission and exhaust valves opening into said pockets and angularly spaced about the axis of the piston rod, and a fuel valve located between the first named valves and adapted to spray fuel into all parts of said piston recess and into all parts of both said valve pockets, the axes of said air admission and exhaust valves being disposed parallel with that of the piston rod, and the axis of said fuel valve being disposed at an acute angle to that of the piston rod.

10. A combustion chamber and valve arrangement for the lower side of a double-acting four-cycle internal combustion engine of the Diesel type, said chamber formed between the head and one end of the piston when at the lower end of its stroke and being arcuate in form and terminating with valve pockets, said arcuate portion being substantially concentric with but radially spaced from the piston rod and extending substantially half way around the same, said valve pockets formed in said head and angularly spaced with respect to the piston rod being separated by an angle of less than 180 degrees, exhaust and air admission valves mounted in said head and opening one into each of said pockets, said valves arranged close to said piston rod with their axes parallel therewith, and a fuel valve also mounted in said head and located between the first named valve, the axis of said fuel valve being disposed at an acute angle to that of said piston rod in such a way that the spray therefrom traverses all of said combustion chamber including both of the valve pockets and yet does not strike the piston rod.

In testimony whereof I have affixed my signature.

PAUL A. RITTER.